United States Patent [19]

Taner et al.

[11] 4,072,922

[45] Feb. 7, 1978

[54] METHOD FOR SEISMIC EXPLORATION FOR ENHANCED RESULTS IN SIMULATED CYLINDRICAL OR PLANE WAVES

[75] Inventors: M. Turhan Taner; Robert E. Sheriff; H. Neal Reeves, all of Houston, Tex.

[73] Assignee: Seiscom Delta Inc.

[21] Appl. No.: 631,715

[22] Filed: Nov. 13, 1975

[51] Int. Cl.$^2$ .......................... G01V 1/20; G01V 1/16
[52] U.S. Cl. .................. 340/15.5 CP; 340/15.5 MC; 340/15.5 F
[58] Field of Search ............... 340/15.5 CP, 15.5 MC, 340/15.5 IF

[56] References Cited

U.S. PATENT DOCUMENTS

| | | | |
|---|---|---|---|
| 2,232,612 | 2/1941 | Klipsch | 340/15.5 MC |
| 2,555,806 | 6/1951 | Mitchell | 340/15.5 CP |
| 2,693,862 | 11/1954 | Rieber | 340/15.5 MC |
| 3,096,846 | 7/1963 | Savit et al. | 340/15.5 MC |
| 3,349,866 | 10/1967 | Mifsud | 340/15.5 MC |
| 3,793,620 | 2/1974 | Miller | 340/15.5 MC |

OTHER PUBLICATIONS

Riley, "Wave Equation Synthesis and Inversion. . . ," 10/74, pp. 89–92, publ. by Stanford Research Inst.

*Primary Examiner*—Nelson Moskowitz
*Attorney, Agent, or Firm*—Pravel, Wilson & Gambrell

[57] ABSTRACT

Seismic sources or source arrays and seismic detectors or detector groups are arranged and spaced with respect to each other during the seismic survey to enhance simulation of plane waves or cylindrical waves, and also to reduce undesirable effects of horizontally travelling seismic noise.

12 Claims, 5 Drawing Figures

METHOD FOR SEISMIC EXPLORATION FOR ENHANCED RESULTS IN SIMULATED CYLINDRICAL OR PLANE WAVES

CROSS-REFERENCE TO RELATED APPLICATIONS

The present invention may be used to enhance the quality of seismic data obtained during seismic surveys for simulation of plane waves or cylindrical waves according to the techniques of U.S. patent application Ser. No. 548,572, assigned to the assignee of the present invention.

BACKGROUND OF THE INVENTION

The present invention relates to seismic exploration.

Prior art seismic exploration techniques have in the past relied predominantly on the common depth point (CDP) stack technique, such as in U.S. Pat. Nos. 2,732,906 and 3,040,833.

Field arrangement of seismic detectors for the CDP were based on a compromise between preservation of vertically travelling seismic energy, containing information regarding the subsurface formations, and cancellation of horizontally travelling energy in the form of noise. Criteria used to establish detector group length in these field arrangements were: first, the length of the detector group could not be so large that reflections from dipping horizons caused time delays across the detector group with resulting signal distortion; second, the length of the detector group could not be so large that normal moveout across the detector group resulted in signal distortion. However, these two considerations limiting the length of detector groups to preserve the signal were compromised by the requirement that for cancellation of horizontal noise the detector group length had to be significantly larger than desirable for signal preservation.

Unequal weighting or spacing of sources or detectors was sometimes used in an attempt to attenuate horizontal noise. However, this technique made field techniques more complicated. Also, if the horizontal energy levels changed, such as due to a change in nature, thickness or velocity of the weathering layer, a new weighting or spacing arrangement was often required.

Another horizontal noise removal method in the CDP field technique was to specify the source-to-near detector offset to be sufficiently large for horizontal noise waves to pass at such a time to leave the geological zone of interest undisturbed by the horizontal noise. However, this method resulted in serious distortion of reflections and loss of shallow reflections where the offset was large.

SUMMARY OF THE INVENTION

Briefly, the present invention provides a new and improved method of seismic exploration with enhancement and optimization of seismic survey results, particularly those used for simulation of the response of seismic horizons to simulated cylindrical or plane waves.

In the method of the present invention, a sensor array or aperture of a plurality of seismic sensors is used to sense the response of the seismic horizons to emitted seismic waves. The sensor array or aperture is larger than the diameter of a circular region, termed the Fresnel zone in the present invention, for the deepest seismic horizon of interest in which all raypaths for seismic waves at a highest frequency of interest differ in phase by less than one-half wavelength. With an aperture of this size, the responses of seismic horizons sensed by the sensors differ from each other in phase by less than one-half wavelength and accordingly when summed to simulate plane or cylindrical waves contribute in some measure to the sum rather than cancelling each other.

Further, in accordance with the present invention, individual sensors in the array are spaced from the next adjacent sensors by less than or equal to one-quarter wavelength of horizontally travelling seismic noise waves at the highest noise frequency of interest. In this manner, when the responses of the sensors are summed to simulate plane of cylindrical waves, the noise waves sensed cancel each other due to the phase differences caused by sensor spacing.

Further in accordance with the present invention, the sensors in the seismic array are equally spaced in extent over the length of the array, as well as equally weighted when summed. The groups of sensors are also contiguous.

DESCRIPTION OF THE PREFERRED EMBODIMENT

Figure 1:
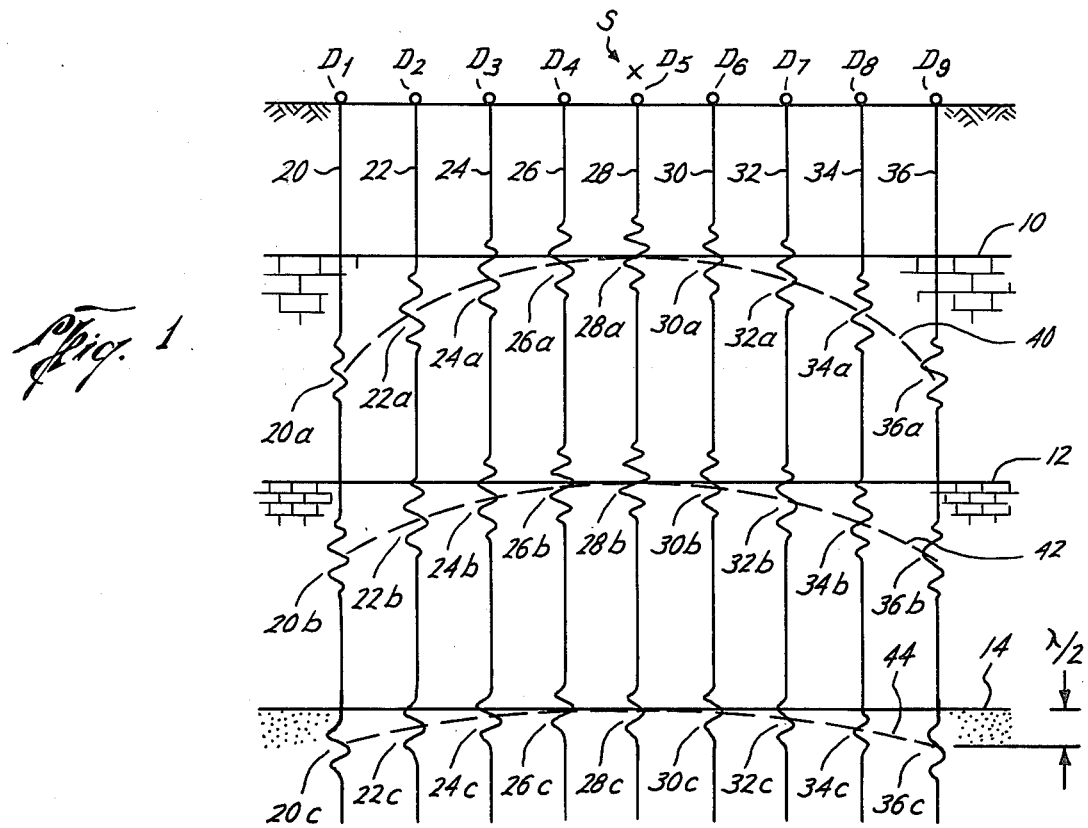
FIG. 1 is a cross-sectional view of seismic horizons in the earth with a group of seismic traces superimposed thereon to illustrate the data elements recorded by detectors, which elements are summed to simulate the response of the seismic horizons to a simulated cylindrical or plane wave.

In the drawings, a seismic source S (FIG. 1) is shown schematically at the surface of the earth at a location for emitting seismic waves into the earth according to the present invention. Although shown on a land surface, the source S could as well be a marine seismic source, as will be understood by those skilled in the art, towed by a marine vessel in a body of water and emitting seismic waves into the body of water and into seismic horizons submerged beneath the body of water.

The source S may be a single source or a group of sources connected together in common and having an effective position at the mid-point of the group. The seismic waves emitted for each emission or shot by the source S travel through seismic horizons or reflectors 10, 12 and 14, and portions of the seismic wave energy travelling downwardly through the earth are reflected by such horizons. A plurality of detector geophones or sensors $D_1$–$D_9$, each of which may be either single sensors, or a group of sensors connected together in common along the survey line and having an effective position at the mid-point of the group, are arranged in a sensor array along the seismic line of profile or over an area to sense the seismic energy reflected from the seismic horizons and convert such sensed energy into electrical signals.

As is known, in addition to the seismic energy travelling downwardly through the earth, horizontally travelling seismic energy in the form of undersired noise is formed each time seismic waves are emitted from the source S. The undesired horizontally travelling seismic noise can be categorized into three components: air wave; ground roll; and horizontal refraction, all of which are sensed by the detectors $D_1$–$D_9$ in addition to the seismic waves reflected from the horizons in the earth.

Air wave horizontal noise represents energy emitted from the source S which travels in the air rather than through the earth and accordingly travels at approximately the velocity of sound in air. Ground roll horizontal noise represents surface-wave energy travelling in the ground along or near the surface of the ground and tending to mask the desired signals. Horizontal refraction noise results from seismic energy travelling downwardly into the earth and rather than reflecting from a horizon, travelling along the horizon and then upwardly to a geophone.

In the above-referenced co-pending U.S. patent application Ser. No. 548,572, assigned to the assignee of the present invention, the method of seismic exploration with simulation of cylindrical or plane seismic waves travelling through the seismic horizons in the earth is set forth. The method disclosed therein involves summing the traces for each point along a seismic survey line as a common receiver point for all seismic shots along the survey line, using the principle of reciprocity where required. When the summation results for each point along the survey line are formed for a survey line of a length which is long with respect to a seismic wavelength, and such summed results are plotted into a seismic section, the plotted seismic section simulates the response of the seismic horizons to a cylindrical wave and forms a seismic section useful for analysis.

Further, as disclosed in such co-pending application, survey results from seismic surveys along several parallel survey lines, thereby forming a rectilinear survey grid or matrix, i.e. rectangular or square, or along a group of transverse or intersecting survey lines to form such a rectilinear matrix, may be summed with the center of such matrix as a common receiver point. The results of the summation would then represent and simulate the response of seismic horizons to a downwardly travelling plane wave centered at the summation point in the center of the matrix.

Referring again to FIG. 1, a group of seismic traces 20 through 36 represents the response sensed by the sensors $D_1$–$D_9$, respectively, along one survey line shown superimposed over the seismic horizons 10, 12 and 14. The trace 20 includes three seismic events 20a, 20b and 20c, representing the reflection of seismic energy by the seismic horizons 10, 12 and 14. In a like manner, traces 22 through 36 have three seismic events therein representing reflection of seismic energy by such horizons.

Due to the finite velocity of the seismic energy in the layers between the seismic horizons, events for the flat horizons do not align along a straight line, but rather a hyperbola. The events corresponding to the reflection of seismic energy from the flat horizon 10 align along a hyperbolic line 40, while the events corresponding to the reflection of seismic energy from the horizons 12 and 14 align along hyperbolic lines 42 and 44, respectivly. As can be seen from comparison of hyperbolic lines 40, 42 and 44 for deeper horizons with generally increasing seismic velocity, the hyperbolic lines tend to flatten out.

As disclosed in the co-pending application Ser. No. 548,572, the seismic traces 20 through 36 are summed to simulate the response sensed at the detector $D_5$ to a plane or cylindrical wave. During such summation, those events which are closely aligned in phase, for example the events on traces 24, 26, 28, 30 and 32 on the parabolic line 40 supplement each other to increase the magnitude of the summed response. Conversely, those events differing significantly in phase from the event 28a sensed at the sensor $D_5$ tend to cancel each other, due to their difference in phase. As the hyperbolic line along which the events occur flattens out, as is evident from the line 44, the number of seismic events which contribute to increased magnitude of the summed response increases, while the number of events which differ in phase to a degree significant enough to detract from the summed response decreases.

With the present invention, it has been found that by using a sensor array or aperture of a length greater than or equal to the diameter of a circular region, for the deepest seismic horizon of interst, in which all raypaths for seismic waves at the highest frequency of interest differ in phase from each other by less than one-half wavelength, $\lambda/2$ (FIG. 1), at this highest frequency, seismic survey results are enhanced and optimized for simultatio of the response of seismic horizons to simulated cylindrical or plane waves.

The circular region is termed in accordance with the present invention the Fresnel zone, since it has been found that a zone so specified for seismic surveying is analogous to the definition of Fresnel zone in optics. More precisely, the Fresnel zone is defined as the first Fresnel zone, since the raypaths differ by less than one-half wavelength. Seismic Fresnel zones of higher numbers would correspond to annular regions in which all raypaths for waves arising from the regions differ from those in the first Fresnel zone by subsequent higher multiples of a half wavelength. Specific examples of array length according to the present invention are set forth below.

By specifying a seismic aperture or array length greater than the diameter of the first seismic Fresnel zone for the deepest geological horizon of interest, it has been found that the aperture is made sufficiently long to accept all constructive contributions of seismic traces sensed over the array for the deepest horizon of interest, while also excluding the out-of-phase, and therefore diminishing, effect of seismic events which would otherwise reduce the magnitude of the summed response for the deeper horizons.

Determination of Aperture Length

Figure 2:
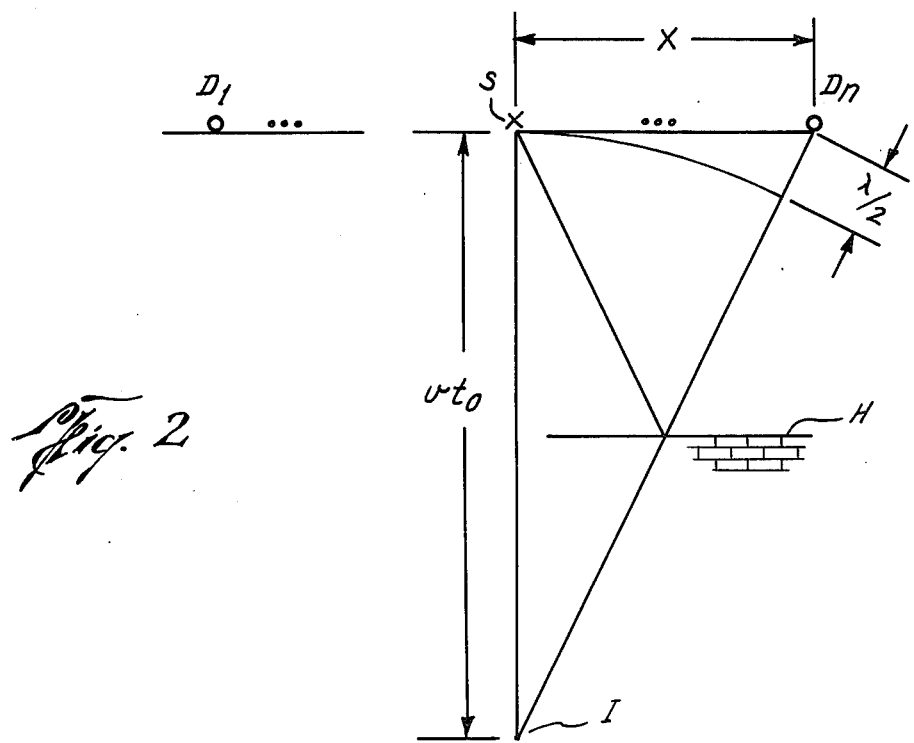
FIG. 2 is a schematic diagram illustrating the length of the sensor array with respect to the deepest seismic horizon of interest according to the present invention.

Referring now to FIG. 2, a seismic horizon H represents the deepest horizon of interest for a seismic survey by a source S and sensors $D_1$–$D_n$. The sensors are symmetrically disposed with respect to the sensor S, and accordingly the distance X between the source S and the furtherest sensor $D_n$ at one end represents one-half the desired aperture length. For an image point I located beneath the horizon H so that straight lines from the image appear the same at the detector $D_n$ as would reflected energy from the source S, and with the further limitation that the arriving raypaths differ from each other by an amount less than or equal to one-half wavelength $\lambda$, a trigonometric relation expressing the lengths of the hypotenuse of a triangle and the sides of the triangle in terms of a seismic average velocity $v$ and two-way travel time $t_0$ can be expressed as follows:

$$(vt_0 + \lambda/2)^2 = (vt_0)^2 + x^2 \qquad (1)$$

Replacing $\lambda$ with an equivalent term $v/f$, where $f$ is the highest frequency of interest, and solving for $x$ yields the following relation:

$$x = [(vt_0 + \frac{v}{2f})^2 - (vt_0)^2]^{1/2} \qquad (2)$$

Simplifying the expression yields:

$$x = v[t_0/f + \frac{1}{4f^2}]^{1/2} \qquad (3)$$

For seismic waves, the second expression in equation (3) is very small compared to the first term and accordingly, equation (3) can be simplified further as follows:

$$x = v\sqrt{t_0/f} \qquad (4)$$

where $x$ represents one-half the length of a seismic aperture according to the present invention.

Chart I below gives suitable examples for conditions generally encountered in seismic surveying:

CHART I

| VELO-CITY v(ft/sec) | HIGHEST FREQUENCY f(hertz) | TWO-WAY TRAVEL TIME t(sec) | X (ft) | APER-TURE LENGTH (ft) |
|---|---|---|---|---|
| 5,000 | 100 (sparker survey) | 2 | 353 | 707 |
| 5,000 | 20 | 4 | 2238 | 4475 |
| 5,000 | 25 | 4 | 2000 | 4000 |
| 15,000 | 20 | 4 | 6714 | 13,428 |

It should be understood that the example aperture lengths set forth above are minimal and that apertures of greater length may be used, if desired. Further, for simulation of plane wave travel, each array in the rectilinear matrix should be at least as long as the aperture length required. In simulation of plane waves, the actual aperture, due to phase cancellation at corners of the rectilinear matrix, is a circular region whose center is the summation point and having a diameter equal to the aperture length.

In addition to an aperture with a length corresponding to or exceeding the diameter of the first Fresnel zone in the manner set forth above, certain other factors with respect to the arrangement of the seismic array have also been found to enhance and optimize seismic survey results for simulation of plane and cylindrical wave travel through the seismic horizons.

Spacing of Sensors to Remove Horizontal Noise

It has been found that by spacing the sensors at a distance less than or equal to one-quarter wavelength for horizontally travelling seismic noise at the highest frequency of interest, a substantial portion of the horizontally travelling seismic noise can be made to cancel upon summation. With spacing between adjacent sensors being less than or equal to one-quarter wavelength of the horizontally travelling seismic noise, sensors receiving positive phase horizontal noise and sensors receiving negative phase horizontal noise are substantially equal in number, causing a substantial reduction in horizontal noise on summation.

Example spacings to substantially reduce seismic noise typically encountered in seismic survey results are set forth in Chart II.

CHART II

| TYPE OF HORIZONTAL NOISE | VELO-CITY v(ft/sec) | FRE-QUENCY (hertz) | $\lambda$ (ft) | SPACING BETWEEN DETEC-TORS (ft) |
|---|---|---|---|---|
| AIR WAVE | 1100 | 55 | 20 | 5 |
| GROUND ROLL | 2000 | 12 | 167 | 42 |
| HORIZONTAL REFRACTION | 10,000 | 50 | 200 | 50 |

Where, as above, the spacing requirements to compensate for the several types of horizontal noise differ, the smallest determined spacing should be used, since with the smallest spacing compensation for all types of noise requiring larger spacing is effected.

Yet another factor found according to the present invention to optimize summation results to simulate plane or cylindrical waves is for the sensors or sensor groups to be continuous along the entire array, contiguous with each other, equally spaced and equally weighted when summed. In this manner, no special instructions to field crews are required, such as special distances and special weighting as were required with prior art CDP techniques, substantially eliminating field layout problems and simplifying instructions for seismic crews. Further, with the continuous, contiguous, equally spaced and equally weighted sensors, no special processing techniques are required prior to summation, significantly simplifying processing techniques.

Figure 3:
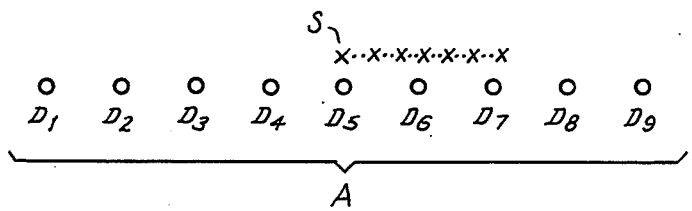
FIGS. 3, 3A and 4 are surface diagrams illustrating the arrangement of seismic sources and sensors during seismic surveying according to the present invention.
Figure 3A:
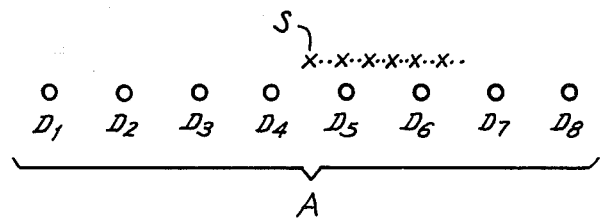

Seismic exploration using the continuous, contiguous, equally spaced, equally weighted seismic detectors spaced from each other by less than one-quarter wavelength at the highest horizontal noise frequency of interest, and in an array greater in length that the diameter of the seismic Fresnel zone according to the present invention may be performed with either split spread or end-on spread surveying. For split spread seismic surveying (FIG. 3 and 3A), the source S, or source array center where a plurality of sources are used in a source array, is located at the geometric center of the active detector spread A, or the center of the aperture. Where an odd number of sensors are used (FIG. 3), the center of the source array S is at the center of the middle detector group $D_5$. Where an even number of detectors are used (FIG. 3A), the center of the source S is located one-half way between the centers of adjacent middle detector groups $D_4$ and $D_5$.

When using either of the split spread arrangments set forth above, the advance interval, or the distance by which all detector and source arrays S are moved between successive recordings, is determined based upon the distance desired between adjacent traces on the final section, which is dependent upon the desired or required resolution of structural detail of the seismic horizons.

Figure 4:
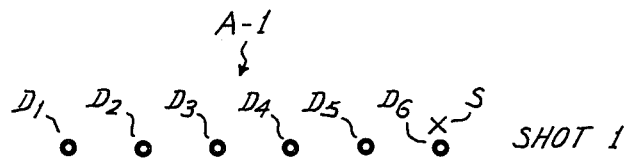

For end-on seismic surveying according to the present invention (FIG. 4), the source S is located at the geometric center of a detector group $D_6$ positioned at one end of a seismic array A-1. With end-on seismic surveying, the length $x$ of the array A-1 represents one-half of the aperture length according to the present invention. The advance interval with end-on surveying should equal the spacing between adjacent detector groups D in order for precise application of the principle of reciprocity to occur. Stated briefly, the principle of reciprocity is that the response sensed at a particular detector from a particular shot point or source location is identical to that received if the position of the source and detector were interchanged. The principle of reciprocity is particularly adapted for marine seismic surveying, since the source is generally located at one end of the sensor array A in marine seismic surveying. In order to construct an aperture of the desired length according to the present invention, the responses of seismic detectors located at the position of the source S for the first shot are summed together during succeeding shots with the responses of the detectors for the first shot, as indicated by the darkened circles for the detectors $D_5$ through $D_1$ for shots two through six, respectively, to form an array of length specified according to the present invention.

Thus, with the present invention, with an aperture whose minimum value is directly related to the first Fresnel zone for the deepest geologic horizon of interest, enhanced seismic survey results are obtained for simulation of cylindrical or plane waves. Further, with the contiguous detector element spacing throughout the sensor aperture A, with the detectors being equally weighted and equally spaced, and with the distance between the detectors equal to or less than one-quarter wavelength of horizontal noise at the highest noise frequency of interest, horizontal noise is substantially cancelled and simplified field arrangement techniques and subsequent processing are obtained.

It should be understood, based on the principle of reciprocity, that wherever in the foregoing description of the preferred embodiment reference is made to a source and detectors, the converse may be used and the words source and detector (or sensor) interchanged. For example, a plurality of sources may be arranged in an array A of length defined by the Fresnel zone according to the present invention and spaced from each other in the manner defined above, with a single sensor at the mid-point of the source array to detect the response of the seismic horizons to the seismic waves from the plural sources.

The foregoing disclosure and description of the invention are illustrative and explanatory thereof, and various changes in the size, shape and materials as well as in the details of the illustrated construction may be made without departing from the spirit of the invention.

We claim:

1. A method of seismic surveying to simulate travel of a seismic wave through seismic horizons in the earth, comprising the steps of:
   a. establishing a seismic source at a position to emit seismic waves into the earth;
   b. establishing seismic sensors along at least one line sensor array of length greater than or equal to the diameter of a circular region for the deepest horizon of interest in which all raypaths for seismic waves from the seismic source at a highest frequency of interest differ in phase from each other by less than one-half wavelength at such highest frequency of interest;
   c. emitting seismic waves from the seismic source; and
   d. sensing the response of the seismic horizons to the emitted waves at the sensors so that the responses sensed at the receivers contribute to, and supplement each other due to the difference in their phase.

2. The method of claim 1, wherein said step of establishing seismic sensors comprises the step of:
   establishing seismic sensors at equally spaced positions from the next adjacent sensors.

3. The method of claim 1, wherein said step of establishing seismic sensors comprises the step of:
   establishing seismic sensors in a continuous array.

4. The method of claim 1, wherein said step of establishing seismic sensors comprises the step of:
   establishing seismic sensors in sensor groups of adjacent sensor elements connected together in common.

5. The method of claim 4, wherein said steps of establishing seismic sensors further comprises:
   establishing the sensor groups in a contiguous array of groups.

6. The method of claim 1, wherein said step of establishing seismic sensors include the steps of:
   a. establishing seismic sensors in plural seismic line arrays, each array being over a distance larger than the diameter of a circular region for the deepest horizon of interest in which all raypaths for seismic waves from the seismic source at a highest frequency of interest differ in phase from each other by less than one-half wavelength at such highest frequency of interest, said plural arrays further forming a rectilinear matrix; and
   b. summing the sensed responses of the seismic arrays in the matrix to simulate the response of the horizons to a plane wave.

7. The method of claim 1, wherein the sensor array is a line array along a seismic line of profile and wherein said said step of establishing a seismic source comprises:
   establishing the seismic source adjacent an end of the line sensor array.

8. The method of claim 1, wherein the sensor array is a line array along a seismic line of profile and wherein said step of establishing a seismic source comprises:
   establishing the seismic source adjacent a midpoint of the line sensor array.

9. A method of split spread seismic surveying of seismic horizons, comprising the steps of:
   a. establishing a continuous array of seismic sensors along the seismic line of profile over a distance greater than or equal to the diameter of a circular region for the deepest horizon of interest in which all raypaths for seismic waves at a highest frequency of interest in the seismic signal from the seismic source differ in phase from each other by less than one-half wavelength at such highest frequency of interest;
   b. establishing a seismic source at the midpoint of the continuous array;
   c. emitting seismic waves from the seismic source; and
   d. sensing the response of the seismic horizon to the emitted waves with the continuous array of seismic sensors.

10. The method of claim 9, wherein said step of establishing a continuous array comprises the step of:
    establishing seismic sensors at equally spaced positions from the next adjacent sensors.

11. The method of claim 9, wherein said step of establishing a continuous array comprises the step of:
    establishing seismic sensors in sensor groups of adjacent sensor elements connected together in common.

12. The method of claim 11, wherein said steps of establishing seismic sensors further comprises:
    establishing the sensor groups in a contiguous array of groups.

* * * * *